United States Patent [19]

Iwamoto et al.

[11] Patent Number: 5,309,549
[45] Date of Patent: May 3, 1994

[54] METHOD FOR AND APPARATUS FOR SYNTHESIZING AND FILLING IN FIGURES HAVING CONTOURS

[75] Inventors: Tetsuo Iwamoto, Tokorozawa; Yasumasa Matsuda; Akira Nakajima, both of Tokyo; Sayuri Oshima, Yokohama, all of Japan

[73] Assignee: Hitachi, Ltd., Tokyo, Japan

[21] Appl. No.: 606,607

[22] Filed: Oct. 31, 1990

[30] Foreign Application Priority Data

Nov. 7, 1989 [JP] Japan .................................. 1-289054

[51] Int. Cl.$^5$ .............................................. G06F 15/62
[52] U.S. Cl. .................................... 395/121; 395/133; 395/135; 395/141
[58] Field of Search ............................. 395/119–121, 395/133–135, 141, 161

[56] References Cited

U.S. PATENT DOCUMENTS

| | | | |
|---|---|---|---|
| 4,815,009 | 3/1989 | Blatin | 395/141 X |
| 4,882,692 | 11/1989 | Saxton et al. | 395/141 X |
| 5,053,759 | 10/1991 | Sato | 395/133 X |

*Primary Examiner*—Gary V. Harkcom
*Assistant Examiner*—Almis Jankus
*Attorney, Agent, or Firm*—Antonelli, Terry, Stout & Kraus

[57] ABSTRACT

A method for drawing a composite figure by combining a plurality of figures. The contours of the plurality of figures are first drawn, and thereafter the insides of the contours are successively filled with in accordance with plane filling attributes of the corresponding figures. Thus, a composite figure with unnecessary contours made to disappear at superposed portions of the figures can be obtained.

6 Claims, 3 Drawing Sheets

METHOD FOR AND APPARATUS FOR SYNTHESIZING AND FILLING IN FIGURES HAVING CONTOURS

BACKGROUND OF THE INVENTION

The present invention relates to an information processing device for making or preparing a document containing figures, or the like, and displaying and/or the document thus formed, and more particularly to a method for drawing figures such as animation, illustration, etc.

In order to draw figures, several kinds of figure processing software have been developed. The prior art figure processing software is to prepare basic figures such as circles, polygons, and to set their contour attributes (kinds of lines, width thereof, color thereof, etc.) and plane attributes (patterns or colors for filling plane areas, for example) and to provide shapes defining the form of the figure, thereby drawing a desired figure.

The prior art, however, has the following drawback. Referring to FIG. 1A, when the basic figures such as FIGS. 21 and 22 which show a foot are to be combined to composite FIGS. 31 to 34 as shown in FIG. 1B, the contour 31 of one basic figure overlaps the other basic figure, thus leaving an unnecessary contour 35. This is because the prior art figure processing software comprises steps such as a first step of collectively filling the contour and interior of one basic or elementary figure and thereafter a second step of filling those of the other figure. More specifically, the FIG. 21 (31, 33) drawn later hides the FIG. 22 (32, 34). The above prior art software may have a function of changing the up-and-down side relationship between the figures. However, even so, the contour 36 of the figure representing the down side remains on the FIG. 33.

SUMMARY OF THE INVENTION

An object of the present invention is to provide a method for drawing a composite figure which, if a plurality of figures are combined, can prevent an unnecessary contour from remaining.

In order to attain this object, in accordance with one aspect of the present invention, in a method for drawing a composite figure composed by partially superposing plural figures by using an information processing device, the contours of the plural figures are drawn and thereafter the respective interiors of the figures are successively filled.

In accordance with another aspect of the present invention, a method for drawing a composite figure by means of an information processing device comprising a central processing unit (CPU), a memory for at least the operation program of the CPU and figure data and an output device for outputting the figure data comprises the steps of extracting from the memory at least data portions defining the contour attributes of plural figure data to be composed, successively drawing the contours of the plural figure in accordance with the contour attributes, extracting data portions defining the plane filling attributes of plural figure data to be composed, and successively filling the interiors of the figures in accordance with the filling attributes thereof.

In the above method, plural figures may be classified into plural groups to draw the contour portion of the figure data for each group and thereafter filling over the insides of the contours.

Additionally, it is preferable to set the same filling attributes for all figures or for each group.

The contour of the figure having the filling plane may be drawn with a line width twice the designated width.

Turning to case where plural figures are superposed to form a composite figure. The present invention makes it possible to easily draw the compoisite figure having the unnecessary contour obviated, unlike the but conventionally programs which to be filled in order to hide unnecessary contour, to easily draw the composite figure having the unnecessary contour obviated.

Particularly, if the operation such as shifting, rotation or deformation is performed for part of such composite figures, a contour which newly appears can be automatically erased, thus providing a very advantageous effect.

DESCRIPTION OF A PREFERRED EMBODIMENT

Figure 1A:
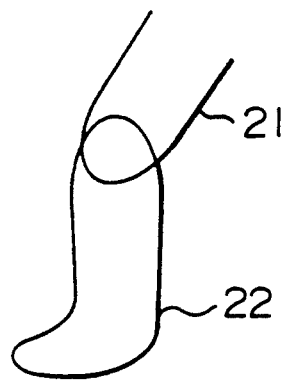
FIGS. 1A and 1B are views for explaining an example of the manner of drawing a composite figure according to the prior art.

Now referring to the drawings, explanation will be given for one embodiment of the present invention.

Figure 3:
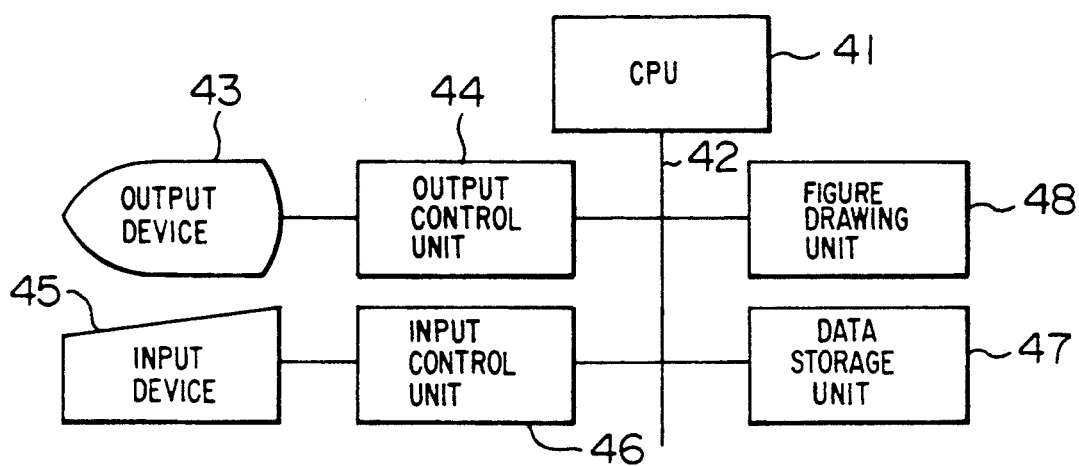
FIG. 3 is a block diagram of the information processing device according to one embodiment of the present invention.

FIG. 3 is a block diagram of the information processing device for processing a document including a figure used for implementing the present invention. In FIG. 3, 41 is a central processing unit (CPU); 42 is a bus which is a transmission path of data; 43 is an output device such as a display device; 44 is an output control unit for controlling the output device 43; 45 is an input device such as a key board; 46 is an input control unit for controlling the input device; 47 is a data storage unit for storing figure data and the like; and 48 is a figure drawing unit for drawing the figure on the output device 43 on the basis of the data stored in the storage unit 47.

Now, explanation will be first made on the figure data table and thereafter on the processing procedure.

Figure 5:
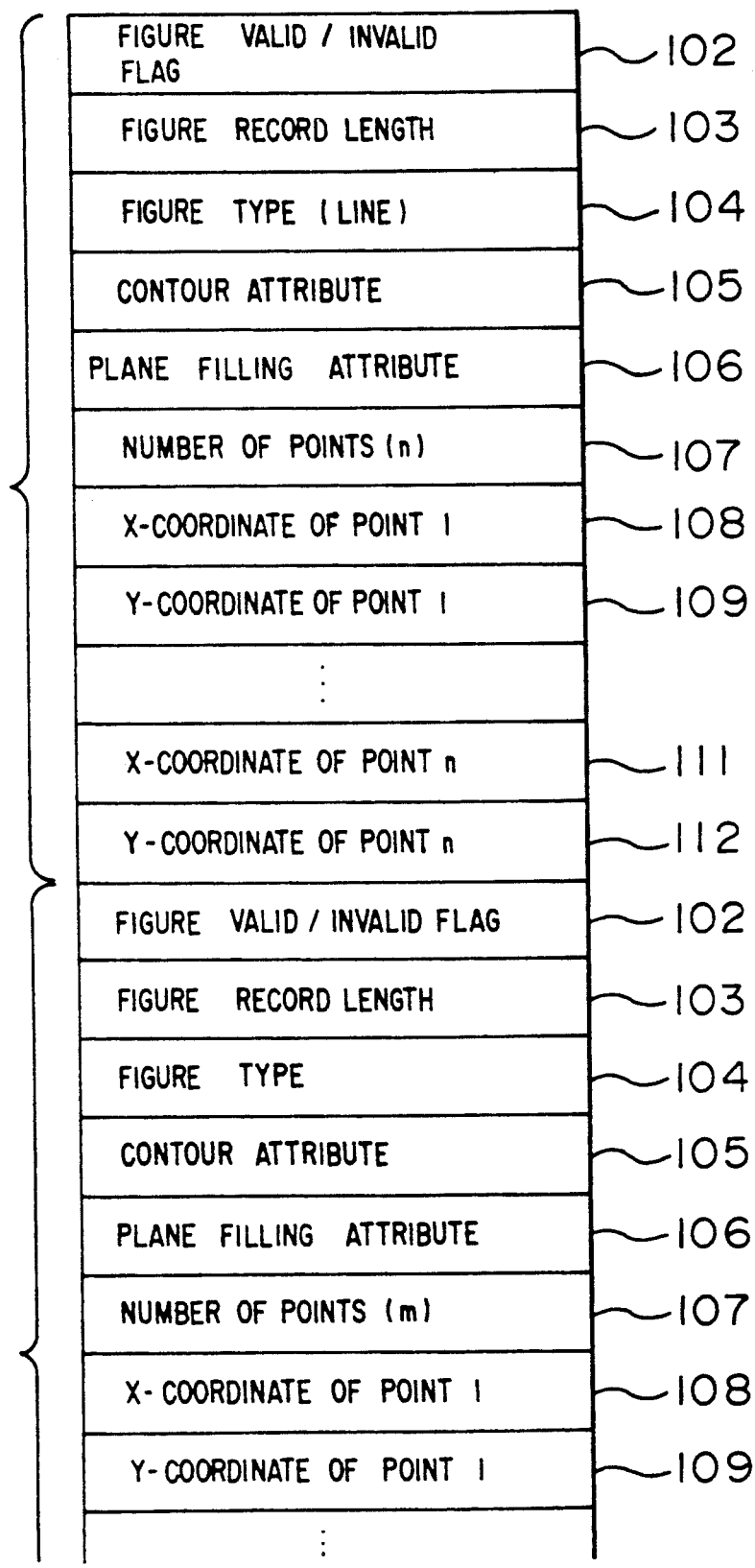
FIG. 5 is a schematic diagram of a figure data table used in the present invention.

FIG. 5 schematically shows the figure data stored in the data storage unit 47.

A figure data 100 is composed of a flag 102 indicating if the figure at issue is valid or invalid (meaning that the figure has been deleted), a record length 103 indicative of the data length of that figure, figure type 104 indicative of the type of the figure such as circle and polygon, a contour attribute 105 such as the type, width, color, etc. of the contour, a plain or area filling attribute 106 such as the pattern, color, etc. inside the figure, the number 107 of points defining the shape of the figure, the X-coordinate 108 of point 1, the Y-coordinate 109 of point 1, . . . , the X-coordinate 111 of point n and the Y-coordinate 112 of point n. Another figure data is composed by the same elements. Now it is assumed that the FIGS. 1 and 2 shown in FIG. 2A correspond to the figure data 100 and 101, respectively.

Figure 4:
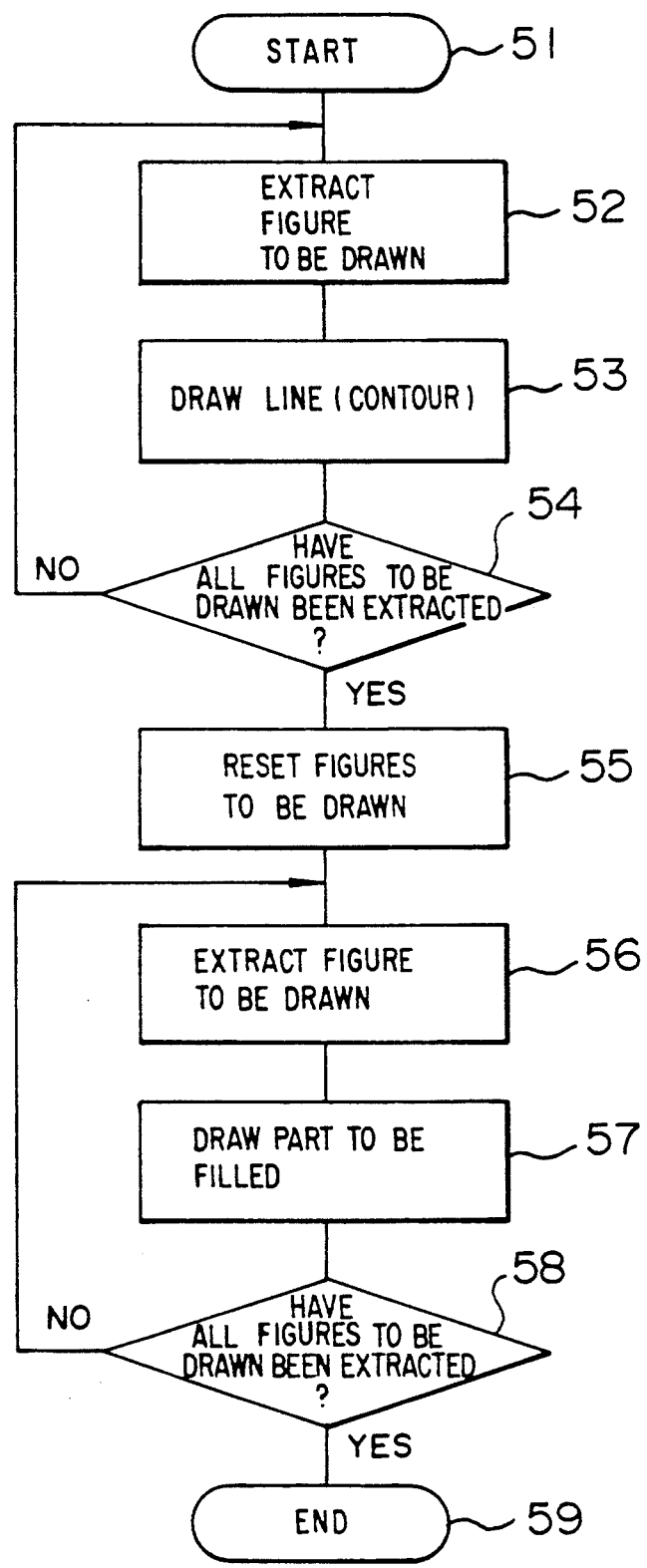
FIG. 4 is a flow chart of the processing flow according to the present invention.

Explanation will be made on the processing process in the present invention in accordance with the flow chart of FIG. 4

In Step 51, the processing process is started.

Figure 1B:
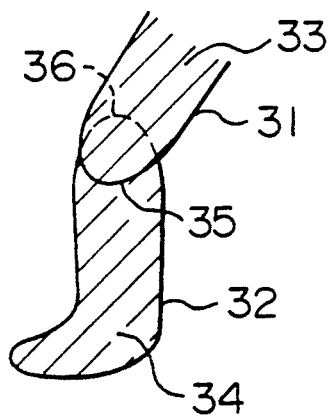
Figure 2A:
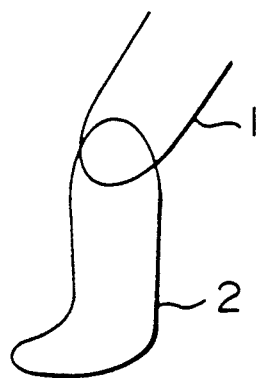
FIGS. 2A and 2B are views for explaining an example of the manner of drawing a composite figure with the contour of a superposed portion of figures according to the present invention.

In Step 52, the figure data 100 of the figure or FIG. 1 to be drawn is extracted.

In Step 53, the contour 11 for the shape data 107 to 112 of the figure is drawn on the basis of the contour attribute 105 of the figure data 100.

Figure 2B:
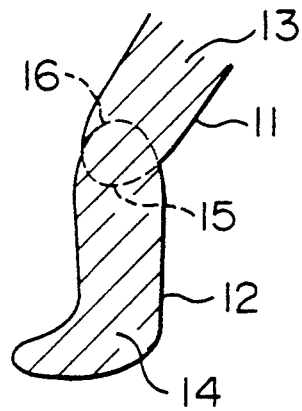

In Step 54, if all the figure data to be drawn have been extracted or not is decided. If the answer is 'YES', the processing process proceeds to Step 55, whereas it is 'NO', the processing returns to Step 52. In this case, since the figure data 102 has not yet been extracted, the process returns to Step 52. Then, the steps mentioned above will be executed again to draw the contour 12 (FIG. 2B).

In Step 55, the figure data with the contour drawn is reset for the preparation of filling a plane.

In Step 56, the figure data 100 is extracted again for filling the plane.

In Step 57, the plane area 13 (FIG. 2B) for the shape data of the FIG. 1 is filled according to the plane filling attribute 106 of the figure data 100. Then, a part 16 of the contour 12 below the plane area 13 is replaced by a filling pattern to disappear.

In step 58, if or not all the figure data to be drawn have been extracted is decided. If the answer is 'YES', the processing process proceeds to Step 59, whereas it is 'NO', the processing returns to Step 52. In this case, since the figure data 101 has not yet been extracted, the process returns to Step 56, and the steps mentioned above will be executed again to fill the plane area 14 (FIG. 2B). Then, a part 15 of the contour 11 below the plane area 14 is replaced by the filling pattern 14 to disappear. Further, if the plane filling attributes of the plane areas 13 and 14 are adapted to be of the same filling attribute, they will be filled to form one plane area.

In Step 59, the processing process is ended.

In the above explanation, any limitation is not added to the figure with its contour to be earlier drawn. However, with a plurality of figures to be drawn previously classified into a plurality of groups, the contours may be drawn earlier only within each group. More specifically, as the case may be, contours later drawn at superposed portions of the figures are not desired to disappear. In such a case, if the present invention is applied to each group, the contour of the figure belonging to the group to be later drawn will not disappear, even if it is drawn on the plane of the figure belonging to the group earlier drawn. These groups are distinguishable according to attributes which are associated with each contour.

Additionally, since the filling operation of a plane is later carried out in this embodiment of the present invention, the inside (half of the line width) of the contour is replaced by a filling pattern, and thus the line width will become half the designated width. If this is problematic, the line width of the contour may be set to be twice as wide as the usual width or the designated width.

Further, the method for drawing a composite figure according to the present invention can be adopted in a large scale integration chip such as a figure drawing processor.

As described above, it should be noted in the method for drawing a composite figure that drawing the contour of each of basic figures and filling the inside of the contour, which have been collectively executed per the respective basic figure according to the prior art, are separately carried out according to the present invention. More specifically, the contours of all the figures to be composed are first drawn and thereafter the insides of these graphics are filled according to an attribute 106. Thus, the unnecessary contour at the superposed portion of the figures is covered with a filling plane pattern designated in accordance with the plane filling attribute thereby preventing the unnecessary contour portion from remaining. This method defines an attribute to be a pattern or color. Such pattern may comprise a single line. Additionally, if the planes of the figures to be composed have the same plane filling attribute, the composed figures can be displayed as an integral figure.

Concretely, the contours of a plurality of basic figures to be composed are drawn as contours 1 and 2 shown in FIG. 2A. Thereafter, the insides of the contours drawn are successively filled in accordance with the plane filling attributes of the figures. Thus, the contours at the superposed portion of the figures are covered with the filling pattern so that unnecessary portions of the contours will disappear.

Further, if the line widths of the contours are narrowed by half, owing to the filling processing, the contours should be drawn with the line width twice as wide as the designated line width. Then, the line width after the filling operation becomes the designated width.

We claim:

1. A method for drawing a composite figure by means of an information processing device comprising a central processing unit (CPU), a storage device storing at least an operation program of said CPU and figure data and an output device for outputting figure data, comprising the steps of:

extracting part of data defining at least contour attributes which is relative to a plurality of figures to be composed;

successively drawing contours of said plurality of figures in accordance with said contour attributes;

extracting part of data defining at least plane filling attributes of said data relative to said plurality of figures to be composed;

successively filling the insides of said contours of said plurality of figures with one of a pattern, color, or both in accordance with the corresponding plane filling attributes thereof; and suppressing a part of said contours which divide a region comprising at least two of said plurality of figures having the same said one of a predetermined pattern, color or both.

2. A method for drawing a composite figure by means of an information processing device comprising a central processing unit (CPU), a storage device storing at least an operation program of the CPU and figure data and an output device for outputting figure data, comprising the steps of:

extracting part of data defining at least contour attributes which is relative to a plurality of figures to be composed;

successively drawing contours of said plurality of figures in accordance with said contour attributes;

extracting pat of data defining at least plane filling attributes of said data relative to said plurality of figures to be composed; and successively filing the insides of said contours of said figures in accordance with the corresponding plane filling attributes thereof; and suppressing part of said contours which divide a region comprising at least two of said plurality of figures having the same said attribute.

3. A method according to claim 1 or claim 2, wherein said plurality of figures are classified into a plurality of groups, and after the contours of the figures are drawn for each group, the insides of the contours are filled for that group.

4. A method according to claim 1 or claim 2, wherein said plane filling attributes are set to be the same for all the figures or for each group.

5. A method according to claim 1 or claim 2, wherein:
said plurality of figures are classified into a plurality of groups, and after said contours of said plurality of figures are drawn for each group, the insides of said contours are filled for that group; and
wherein said plane filling attributes are set to be the same for all said plurality of figures or for each group.

6. A method according to claim 1 or claim 2, wherein the contour of each figure defining a plane to be filled is drawn with a line width twice as wide as a predetermined width.

* * * * *